Patented Oct. 25, 1932

1,885,035

UNITED STATES PATENT OFFICE

CHRISTIAN J. HANSEN, OF ESSEN-ON-THE-RUHR, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

TREATING THIOCYANATES

No Drawing. Original application filed August 9, 1928, Serial No. 298,617, and in Germany April 14, 1928. Divided and this application filed November 29, 1929. Serial No. 410,649.

My invention refers to the treatment of thiocyanogen compounds and more especially ammonium thiocyanate, whereby a decomposition of such compounds is obtained and sulfur and the corresponding sulfates, such as ammonium sulfate, are recovered. It is an object of my invention to provide means whereby this decomposition of the thiocyanogen compounds and conversion into sulfates and free sulfur can be effected in a simpler and more efficient manner and at lower cost, than was hitherto possible.

Hitherto solutions of ammonium thiocyanate, such as resulted for instance in the purification of gases developed in the distillation of carbon and other carbonaceous material, have been subjected to hydrolytic decomposition by heating same with acids, more especially with dilute sulfuric acid. This decomposition results in the formation of ammonium sulfate and carbon oxysulfide, which is partly decomposed in the presence of water into carbon dioxide and hydrogen sulfide. This way of proceeding entails the drawback that it requires a considerable outlay for the sulfuric acid required in the decomposition, and the sulfur compounds resulting in the reaction must be subjected separately to further treatment.

This is a division of my application, Serial No. 298,617, filed August 9, 1928, in which I have described a generally applicable method of decomposing thiocyanates and of forming ammonium compounds therefrom by heating an aqueous solution of such thiocyanates in the presence of compounds containing the radical $SO_2$.

According to the present invention the ammonia and hydrogen sulfide contained in the coal distillation gases can be utilized to promote the hydrolytic decomposition of thiocyanates, whereby ammonium sulfate and free sulfur are formed in a particularly simple and effective manner. No separate reagents such as sulfuric acid are thereby required and the ammonium is converted in a single operation into ammonium sulfate and free sulfur.

I have ascertained that if ammonium thiocyanate is decomposed hydrolytically with- in the washing liquor, which results in the purification of coal distillation gases, and contains either polythionates or corresponding quantities of thiosulfate and sulfur dioxide i. e. the constituents of polythionates or the reaction, which occurs when heating such liquor will result in the formation of ammonium sulfate and of elementary sulfur. The same result is obtained of an aqueous solution of thiocyanates is heated after the addition of polythionates or their constituents, viz. thiosulfates and sulfur dioxide.

It is well known that a complete decomposition of the salts contained in these liquids into sulfate and free sulfur requires predetermined proportions of the several constituents, i. e. that for each molecule of a polythionate two molecules of sulfite or thiosulfate and for each two molecules of a bisulfite one molecule of sulfate or thiosulfate be present. If the quantities of sulfite or thiosulfate in solution are greater, complete decomposition is not possible inasmuch as in that case the solution contains besides sulfate also non-decomposed thiosulfate. If there is polythionate or bisulfite in excess in the solution, there is formed, when operating in closed vessels, besides ammonium sulfate a corresponding quantity of free sulfuric acid.

Before going into the details of my invention and how the same is carried out in practice, I will first explain the facts on which this invention is based.

First of all I found that ammonium thiocyanate can be decomposed in a quantitative manner by heating an aqueous solution thereof with sulfur dioxide, ammonium bisulfite or ammonium thiosulfate in combination with sulfur dioxide.

The following equation serves to illustrate this decomposition:

I. 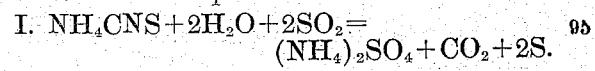

This reaction can be explained as follows:
The decomposition of thiocyanic acid occurs according to the equation:

II. 

Carbon oxysulfide is further decomposed in contact with water according to the equation:

III. $COS + H_2O = CO_2 + H_2S$

Thus from 1HCNS is finally formed $1NH_3$ and $1H_2S$.

If ammonium thiocyanate is treated in this way, $2NH_3$ and $1H_2S$ will result.

In order to produce $1(NH_4)_2SO_4$ from $NH_4CNS$, the sulfur dioxide must first be converted into $SO_3$ according to the equation:

IV. $3SO_2 = 2SO_3 + S$.

Therefore in order to obtain $1SO_3$, $1,5SO_2$ is required, which results in $1SO_3 + 0,5S$.

Further in order to convert the hydrogen sulfide obtained in the decomposition of COS (Equation III) into sulfur, I require according to the equation:

V. $2H_2S + SO_2 = 3S + 2H_2O$, additional $0,5SO_2$ per molecule ammonium thiocyanate.

If the above quantities of $SO_2$ are added, there results, that per molecule ammonium thiocyanate $2SO_2$ are required, which furnish $0,5 + 1,5 = 2S$.

The above proves that Equation I is covered.

In order to carry this process through, $2SO_2$ must be produced by oxidation of $2S$ per molecule ammonium thiocyanate. However, just as $2S$ are recovered in the process in the form of elementary sulfur, no extraneous sulfur at all is required in the process.

The conversion according to Equation I takes place slowly at ordinary temperature, while at 100° C. about 50 per cent of a 20 per cent solution of $NH_4CNS$ will be decomposed in eight to ten hours. At a temperature between 180 and 200° C. the ammonium thiocyanate will be decomposed quantitatively in not more than two hours.

If operating with polythionate instead of sulfur dioxide, the reaction occurs according to the following equation:

VI. $NH_4CNS + 2H_2O + 2(NH_4)_2S_3O_6 =$
$\quad 3(NH_4)_2SO_4 + CO_2 + 4S$

This reaction can be explained as follows: According to the equation

VII. $(NH_4)_2S_3O_6 = (NH_4)_2SO_4 + SO_2 + S$ 1 molecule trithionate when heated, is decomposed into 1 molecule sulfate, $1SO_2 + 1S$. If higher polythionates are used, the same compounds will result, but in that case more sulfur is obtained, for instance in the case of tetrathionate $2S$, in the case of pentathionate $3S$.

The Equation VII thus shows that here 1 polythionate is equivalent of $1SO_2$.

The Equation VI further shows that by using trithionate $4S$, by the use of tetra- and pentathionate 6 and $8S$ respectively are obtained.

The production of a polythionate, such as the trithionate from thiosulfate occurs according to the following equation:

VIII. $2(NH_4)_2S_2O_3 + 3SO_2 =$
$\quad 2(NH_4)_2S_3O_6 + S$.

This reaction occurs in several intermediate steps, only one of which has hitherto been ascertained. When introducing sulfur dioxide into a solution of thiosulfate, in contradistinction to the treatment of thiosulfates with other acids no or very little sulfur will at first separate and the solution will remain limpid and will at the same time assume a deep yellow color. The solution now contains an additive compound of 1 molecule thiosulfate and 1 molecule $SO_2$. The polythionate will form from these two compounds, the formation occurring slowly at ordinary temperature and more rapidly upon heating.

If it is desired to produce sulfate from thiosulfate by way of a polythionate, the simplest method is that which follows the equation:

IX. $(NH_4)_2S_3O_6 + 2(NH_4)_2S_2O_3 =$
$\quad 3(NH_4)_2SO_4 + 4S$.

In order to satisfy this equation merely one third of the thiosulfate must be converted into polythionate with the aid of sulfur dioxide. According to Equation VIII each molecule polythionate to be produced requires $1,5SO_2$, which shows that in order to convert thiosulfate into sulfate, $0,5SO_2$ must be added per molecule thiosulfate.

Taking into consideration the Equations VIII and IX, the conversion of thiosulfate into sulfate occurs according to the equation:

X. $2(NH_4)_2S_2O_3 + 1SO_2 = 2(NH_4)_2SO_4 + 3S$.

The Equations VI and VIII further show that a mixture of ammonium thiosulfate and ammonium thiocyanate can be converted by means of sulfur dioxide into sulfate and sulfur according to the equation:

XI. $NH_4CNS + 2H_2O + 2(NH_4)_2S_2O_3 +$
$\quad 3SO_2 = 3(NH_4)_2SO_4 + CO_2 + 5S$.

This equation shows how ammonium thiosulfate and ammonium thiocyanate can be converted directly into sulfate and sulfur by acting with sulfur dioxide.

I may however also convert ammonium thiocyanate into sulfate and sulfur with the aid of ammonium bisulfite according to the equation:

XII. $NH_4CNS + 8NH_4HSO_3 =$
$\quad 5(NH_4)_2SO_4 + CO_2 + 2H_2O + 4S$.

This reaction can be explained as follows:

As shown in Equation I, $2SO_2$ are required per molecule $NH_4CNS$. On the other hand a mixture of 1 molecule ammonium sulfite and 2 molecules ammonium bisulfite when heated, will also be converted into sulfate and sulfur according to the equation:

XIII. $(NH_4)_2SO_3 + 2NH_4HSO_3 = 2(NH_4)_2SO_4 + S + H_2O$

Now as $1NH_4CNS$ requires $2SO_2$, the double of the quantities shown in Equation XIII must be used. The $2SO_2$ are bound by the sulfite which is thus converted into bisulfite. This shows the way, in which the $8NH_4HSO_3$ are required according to Equation XII per molecule $NH_4CNS$.

All these conversions of ammonium thiocyanate take place slowly at ordinary temperature, more rapidly at an elevated temperature. At about 100° C. about one-half of the ammonium thiocyanate is decomposed within eight to ten hours, while at 180–200° the conversion will be completed on one to two hours, all ammonium thiocyanate having disappeared.

If less sulfur dioxide, bisulfite or polythionate is used than corresponds to the respective equations, the reaction will not be complete and the liquor will usually still contain some ammonium thiosufate and non-decomposed ammonium thiocyanate. On the other hand an excess of sulfur dioxide, bisulfite or polythionate will not be harmful, the conversion being quantitative and the excess of sulfur dioxide being converted into sulfuric acid and sulfur according to Equation IV. In this case the liquor contains more or less sulfuric acid, which can be neutralized by adding ammonia before evaporation.

The process is preferably carried through at a temperature which materially exceeds 100° C., for instance at 140–160° or above, and under increased pressure. The ammonium thiocyanate may be contained in the liquor from the beginning. If in the purification of coal distillation gases the contents of cyanogen compounds are recovered separately under the form of ammonium thiocyanate, the solution thus obtained may be added to the washing liquor serving for removing from the gas ammonia and hydrogen sulfide. One may however also conduct the washing process in such manner that the contents of cyanogen compounds, ammonia and hydrogen sulfide in the gases are washed out in a single operation.

On the other hand, if the ammonium thiocyanate is recovered in a separate washing operation, it is also possible to force the solution of ammonium thiocyanate thus obtained into the heated decomposition vessel. In a similar manner a polythionate solution containing ammonium thiocyanate, which may be preheated if desired, may also be forced into the heated conversion chamber.

*Example 1*

Into a solution of 100 kgs ammonium thiocyanate and 389.3 kgs. ammonium thiosulfate in 400 kgs water which is contained in a closed pressure resisting vessel, 252,5 kgs sulfur dioxide are introduced. The liquor thus treated is then heated to about 180° C. After four to six hours all the thiocyanate is decomposed into sulfate and sulfur. There results a watery solution of 520,7 kgs ammonium sulfate, and 210,7 kgs pure molten sulfur besides 57,8 kgs carbon dioxide gas which may be tapped off.

I may also introduce the sulfur dioxide gradually during the heating period.

If the reaction is carried through at 220° C. the conversion will already be complete within one or two hours, while at lower temperature longer heating is required.

*Example 2*

Into a solution of 100 kgs ammonium thiocyanate and 1559 kgs ammonium thiosulfate in 1500 kgs water are introduced 505,3 kgs sulfur dioxide and the liquor is treated as described with reference to Example 1. There results a watery solution containing 1562 kgs ammonium sulfate besides 589,3 kgs of pure molten sulfur and 57,8 kgs carbon dioxide.

*Example 3*

Into a solution of 100 kgs ammonium thiocyanate and 389,2 kgs ammonium thiosulfate in 500 kgs water are introduced 336,7 kgs sulfur dioxide. The solution is treated as described with reference to Example 1. The resulting watery solution contains 520,7 kgs ammonium sulfate and 85,9 kgs free sulfuric acid. There are further obtained 224,5 kgs pure molten sulfur and 57,8 kgs carbon dioxide.

*Example 4*

A solution of 100 kgs ammonium thiocyanate, 600 kgs ammonium tri-thionate in 700 kgs water is treated as described with reference to Example 1. There results a solution containing 520,7 kgs ammonium sulfate and there are further obtained 168,5 kgs pure molten sulfur and 57,8 kgs carbon dioxide.

*Example 5*

A solution containing 100 kgs ammonium thiocyanate, 690 kgs ammonium trithionate in 1000 kgs water is treated as described with reference to Example 1. There is obtained a watery solution containing 573 kgs ammomium sulfate, 25,8 kgs free sulfuric acid. There result further 185,3 kgs pure molten sulfur and 57,8 kgs carbon dioxide.

In every case the ammonium trithionate may be replaced by tetrathionate or pentathionate, or a mixture of such compounds may be applied. The process will occur in exactly the same manner, only the quantity of sulfur resulting in the process will be greater.

Example 6

A solution of 100 kgs ammonium thiocyanate, 684 kgs ammonium tetrathionate in 700 kgs water is treated as described with reference to Example 1. There results a solution of 520,7 kgs ammonium sulfate and there are further obtained 252,8 kgs pure molten sulfur and 57,8 kgs carbon dioxide.

Example 7

A solution containing 100 kgs ammonium thiocyanate, 768 kgs ammonium pentathionate in 700 kgs water is treated as described with reference to Example 1. The resulting watery solution contains 520,7 kgs ammonium sulfate and there are further obtained 337 kgs pure molten sulfur and 57,8 kgs carbon dioxide.

Example 8

A watery solution containing 100 kgs ammonium thiocyanate, 1499 kgs ammonium trithionate and 1168 kgs ammonium thiosulfate are treated as described with reference to Example 1. There results a watery solution containing 2083 kgs ammonium sulfate and there are further obtained 674 kgs pure molten sulfur and 57,8 kgs carbon dioxide.

Example 9

A solution containing 100 kgs ammonium thiocyanate, 1710 kgs ammonium tetrathionate and 1168 kgs ammonium thiosulfate in 3000 kgs water is treated as described with reference to Example 1. There results a watery solution of 2083 kgs ammonium sulfate, further 885 kgs pure molten sulfur and 57,8 kgs carbon dioxide.

Various changes may be made in the details disclosed in the foregoing specification without departing from the invention or sacrificing the advantages thereof.

I claim:

1. The method of decomposing thiocyanates and of producing ammonium compounds therefrom comprising heating an aqueous solution of such thiocyanates in the presence of a thionate.

2. The method of decomposing thiocyanates and of producing ammonium compounds therefrom comprising heating an aqueous solution of such thiocyanates under pressure to about 180–220° C. in the presence of a thionate.

3. The method of decomposing thiocyanates and of producing ammonium compounds therefrom comprising heating an aqueous solution of such thiocyanates in the presence of a polythionate.

4. The method of decomposing thiocyanates and of producing ammonium compounds therefrom comprising heating an acqueous solution of such thiocyanates under pressure to about 180–220° C. in the presence of a polythionate.

5. The method of decomposing thiocyanates and of producing ammonium compounds therefrom comprising heating an aqueous solution of such thiocyanates in the presence of a polythionate and of a thiosulfate.

6. The method of decomposing thiocyanates and of producing ammonium compounds therefrom comprising heating an aqueous solution of such thiocyanates under pressure to about 180–220° C. in the presence of a polythionate and a thiosulfate.

7. The method of decomposing ammonium thiocyanates and of producing ammonium compounds therefrom comprising heating an aqueous solution of such thiocyanates in the presence of an ammonium thionate.

8. The method of decomposing ammonium thiocyanates and of producing ammonium compounds therefrom comprising heating an aqueous solution of such thiocyanates in the presence of an ammonium polythionate.

9. The method of decomposing ammonium thiocyanates and of producing ammonium compounds therefrom comprising heating an aqueous solution of such thiocyanates in the presence of an ammonium polythionate and an ammonium thiosulfate.

In testimony whereof I affix my signature.

CHRISTIAN J. HANSEN.